Jan. 25, 1966  F. S. WEISS  3,231,082
CAPACITOR CONVEYING STRIP
Original Filed April 20, 1956  4 Sheets-Sheet 2

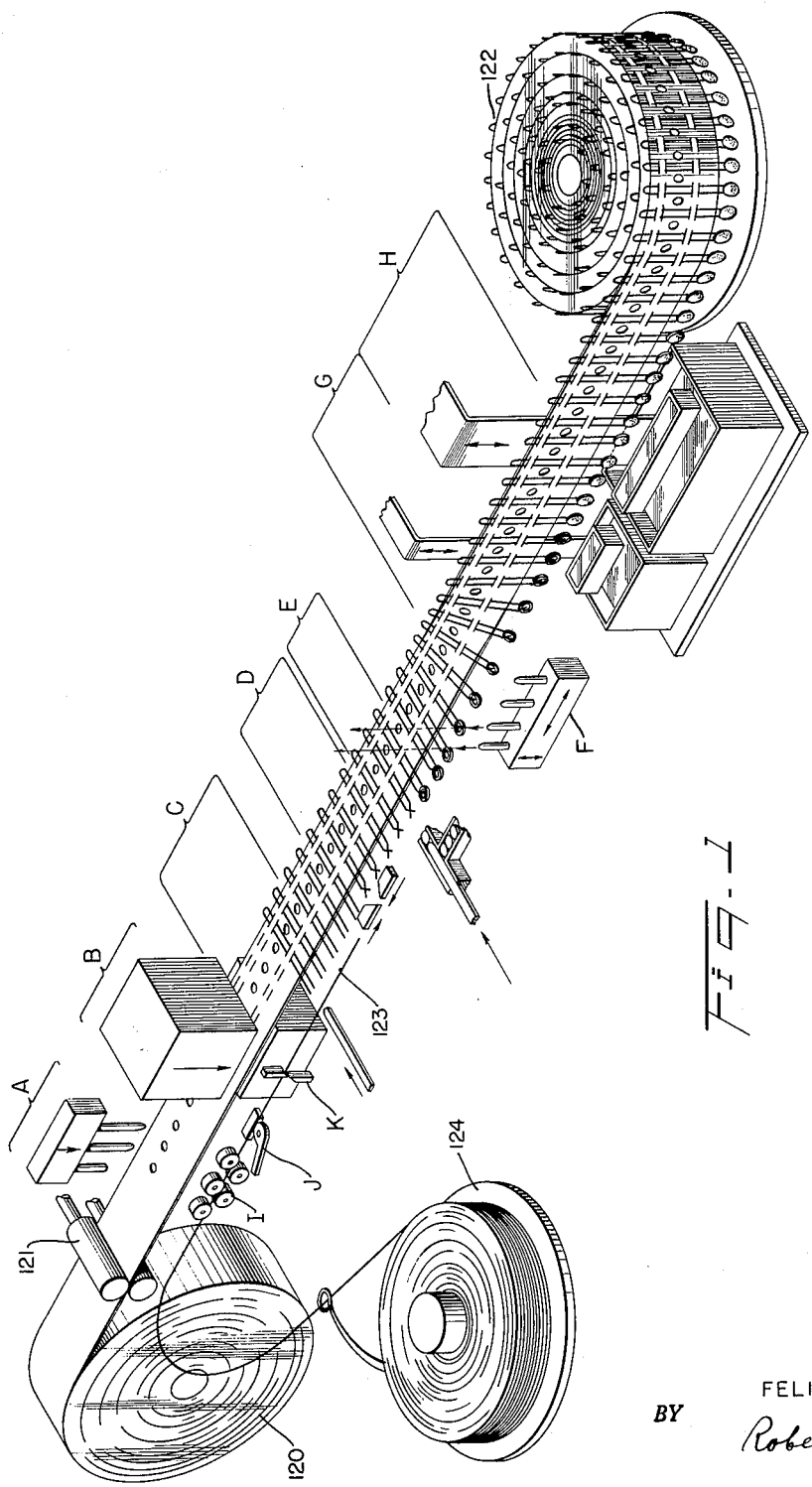

INVENTOR.
FELIX S. WEISS
BY Robert E. Isner
ATTORNEY

Jan. 25, 1966     F. S. WEISS     3,231,082
CAPACITOR CONVEYING STRIP
Original Filed April 20, 1956     4 Sheets-Sheet 3
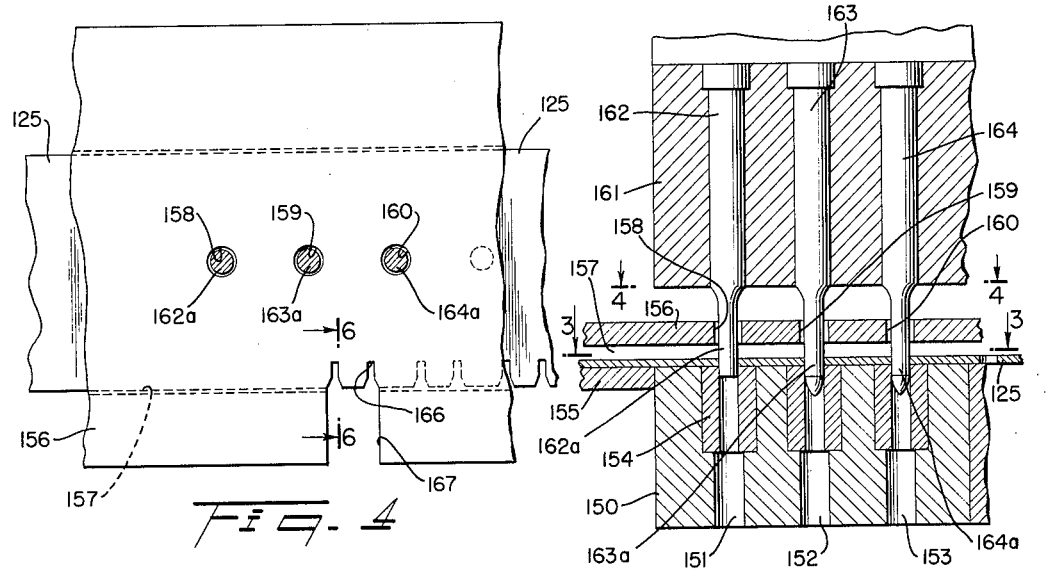
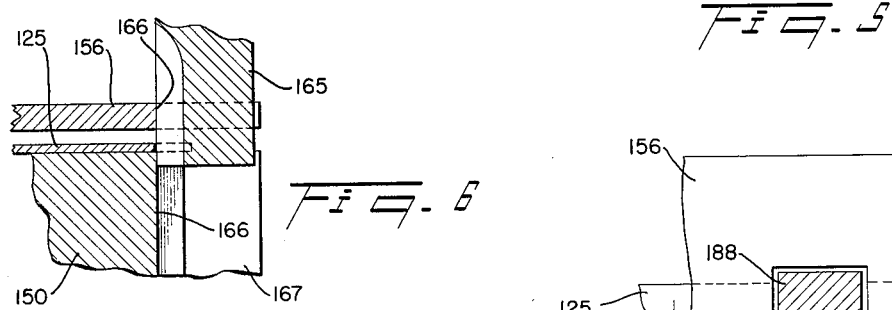
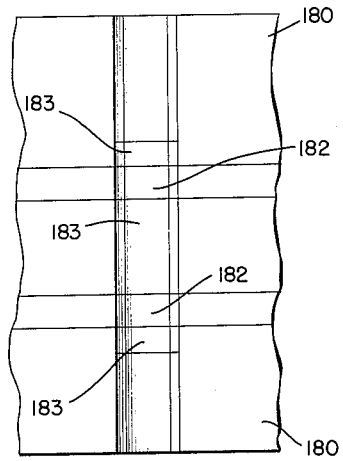
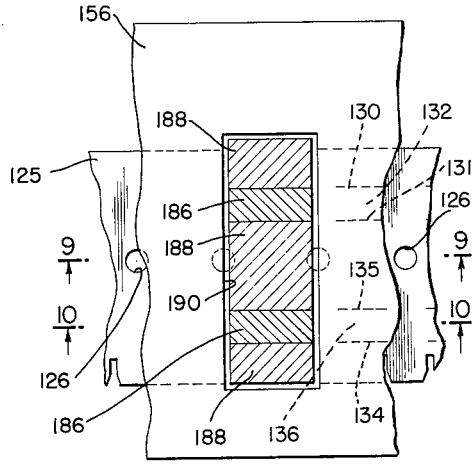
INVENTOR.
FELIX S. WEISS
BY
Robert R. Isner
ATTORNEY Jan. 25, 1966   F. S. WEISS   3,231,082
CAPACITOR CONVEYING STRIP
Original Filed April 20, 1956   4 Sheets-Sheet 4
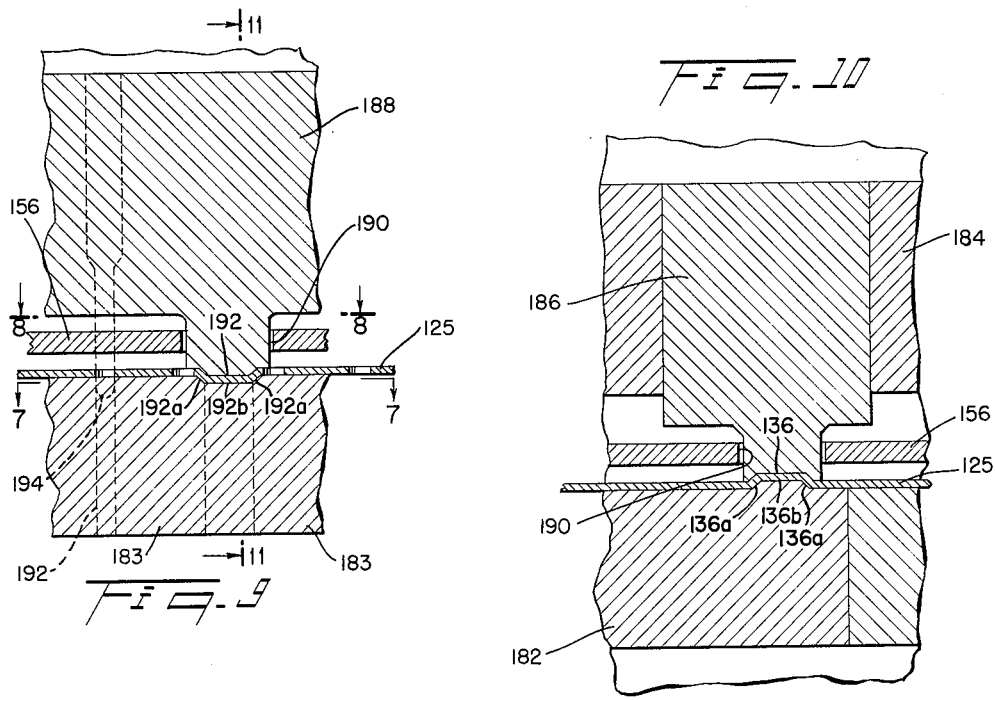
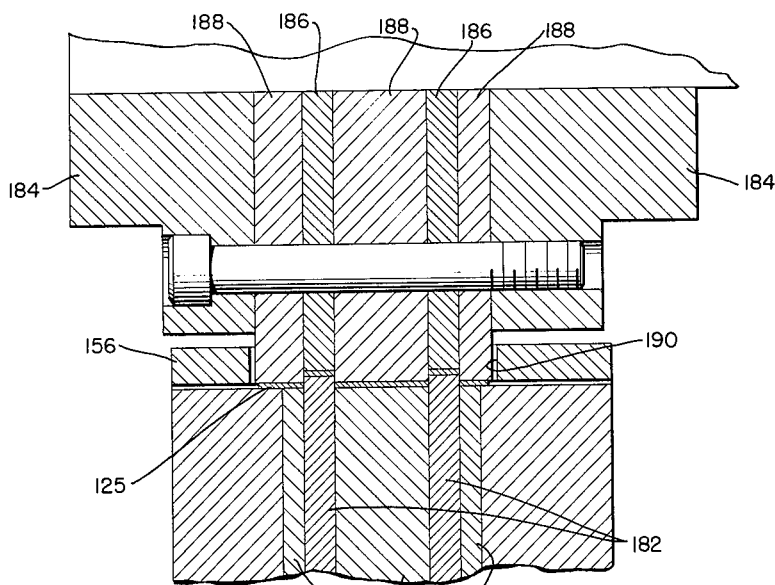
INVENTOR.
FELIX S. WEISS
BY
*Robert R. Isner*
ATTORNEY

United States Patent Office 3,231,082
Patented Jan. 25, 1966

3,231,082
CAPACITOR CONVEYING STRIP
Felix S. Weiss, Chestnut Hill, Mass., assignor to Cornell-Dubilier Electric Corporation, South Plainfield, N.J., a corporation of Delaware
Application Mar. 13, 1959, Ser. No. 799,200, which is a division of application Ser. No. 579,679, Apr. 20, 1956. Divided and this application Jan. 25, 1963, Ser. No. 267,067
6 Claims. (Cl. 206—56)

This application is a division of my application Serial No. 799,200 filed March 13, 1959, now abandoned, which application is a division of my application Serial No. 579,679 filed April 20, 1956, now abandoned.

This invention relates to certain improvements in machines for manufacturing capacitors, and similar relatively small electrical instrumentalities incorporating a plurality of extending terminal wires, by production line methods in which an effectively endless conveying medium, such as, in the preferred form here shown, a dispensable strip of flexible paperlike material, advances the material from which the capacitor or other electrical instrumentality is to be assembled and finally the capacitor or other instrumentality itself to various operating stations at which sequential steps of assembly and eventually final processing and, if desirable, testing of the completed units are performed.

This application is particularly concerned, as will be described more fully hereinafter, with improved structures for a processing station at which the conveying medium is deformed or otherwise conditioned to permit its utilization for the purposes specified and with the provision of a consumable or dispensable conveying medium of a particular and commercially advantageous character.

The mechanical improvements and operations which are the subject of this invention are adaptable to the above described general method of assembly and production for the principles, purpose and object of the increasing efficiency of production of such methods and the quality and uniformity of such articles so produced. While its principles may be used in the production of capacitors and other similar electrical instrumentalities such as resistors and rectifiers in various sizes and shapes and which incorporate a plurality of extending terminal wires and may be applied whether the conveying strip be made of one flexible material or another, the present invention is particularly useful in the manufacture of ceramic disc capacitors which include a relatively small ceramic dielectric disc with a layer of conducting material disposed on each of the opposite faces thereof and serving as the electrode elements for the capacitor units. In the assembling of such units, suitable terminal or lead wires are secured to the conducting layers on the ceramic disc and the disc and adjacent portions of the terminal wires secured thereto are covered with a coating of suitable insulating material.

The success of the use of continuous assembly methods of the general type described in the manufacture of these ceramic disc type capacitors depends not only upon the rapidity and continuous flow of operations at the various assembly and processing stations, but also upon the accuracy and reproducibility of those operations at each station, all to the end that each capacitor as it comes to a point of completion, is as much like the preceding and following capacitors as possible. These objectives are materially aided by the provision of a conveying medium so constituted as to facilitate the mounting of the capacitor subassemblies thereon and to integrally insure the releasably secured engagement of the progressively formed capacitor subassemblies thereon as well as to insure the proper indexing of the medium and medium mounted subassemblies during its advance through the sequentially arranged operating station.

One of the important features of the continuous assembly method of the general type described is the permitted utilization of the dispensable conveyor strip as a packaging mount for easily identifiable pluralities of the finished units. Such may be utilized in automatic fabrication machines to obtain the desired acurate advance and positioning of the web mounted electrical instrumentalities that is required, for example, in the automatic assembly of printed circuits. As a consequence thereof it is highly desirable to provide a conveyor medium of a character that, in addition to meting the fabrication requirements above set forth, also facilitates its eventual utilization in automatic assembling machines.

This invention may be briefly described as an improved mechanism for deforming or conditioning a conveying medium so as to render the same advantageously usable in the continuous assembly methods of the general type described and, in its broader aspects, to include the provision of a dispensable conveying medium of a particular and advantageous character.

Among the advantages attendant the instant invention is the provision of a dispensable conveyor medium of a character such as to permit the mounting of U-shaped hairpin type terminal lead assemblies thereon without utilization of additional fastening means and in such manner as to prevent undesired displacement thereof occasioned by conveyor medium displacement through the sequentially and arranged stations. Additionally, the conveyor medium is of such a character as to permit convenient indexing thereof in the sequentially arranged operating stations and thereby assure operative engagement of the progressively fabricated subassemblies with the operating elements therein.

Another advantage of the herein disclosed invention is a conveyor medium of a character that conveniently permits its eventual utilization in automatic assembly machines as, for example, are used in the automatic assembly of printed circuits.

Another advantage of the herein disclosed invention is a conveyor medium of a character that conveniently permits its eventual utilization as an automatic inventory record. As for example, it eliminates the counting of a large number of small devices usually held in a container and automatically shows the inventory number of such devices that remain during the steps of operation in an assembly line.

The objects of this invention are the provisions of improved apparatus for conditioning a conveyor medium and the provision of an improved conveyor medium for utilization in the continuous assembly methods of the general type described.

Other objects and advantages of the invention herein described will be pointed out in the following disclosure and claims and will be illustrated in the accompanying drawings which disclose, by way of example, the principles underlying the invention and the presently preferred embodiment incorporating those principles, and by which said principles may be usefully employed in the production of finished ceramic disc capacitors and other small electrical instrumentalities having a plurality of extending terminal wires, such as resistors and rectifiers, by a high degree of uniformity and with reduced fabrication costs.

Referring to the drawings:

FIGURE 1 is a schematic flow diagram indicative of certain of operations performed in the continuous assembly methods of the general type herein of concern;

FIGURES 3 through 6 are sectional views of the essential mechanical components includable in the pilot hole perforation station A of FIGURE 1 and, more specifically;

FIGURE 3 is a sectional view taken on the line 3—3 of FIGURE 5;

FIGURE 4 is a sectional view taken on the line 4—4 of FIGURE 5;

FIGURE 5 is a sectional view taken on the line 5—5 of FIGURE 3;

FIGURE 6 is a sectional view taken on the line 6—6 of FIGURE 4;

FIGURES 7 through 11 are sectional views of the essential mechanical components includable in the web slitting station B of FIGURE 1 and, more specifically;

FIGURE 7 is a sectional view taken on the line 7—7 of FIGURE 9;

FIGURE 8 is a sectional view taken on the line 8—8 of FIGURE 9;

FIGURE 9 is a sectional view taken on the line 9—9 of FIGURE 8;

FIGURE 10 is a sectional view taken on the line 10—10 of FIGURE 8;

FIGURE 11 is a sectional view taken on the line 11—11 of FIGURE 9.

Figure 2A:
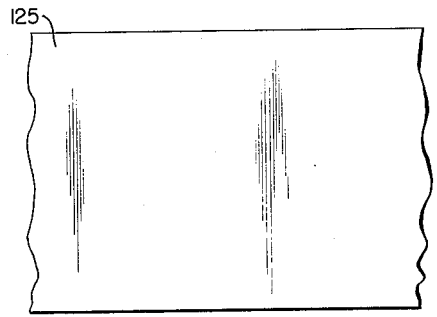
FIGURES 2a through 2c are schematic plan views of a portion of a dispensable conveyor showing the sequential formation thereof.

As indicated above, the subject matter of the herein disclosed and claimed invention is of particular utility in the fabrication of ceramic disc type capacitors by continuous assembly production line methods employing a dispensable conveyor strip; however, as will be apparent to those skilled in the art, some or all the advantages attendant the practice of the invention are equally attainable, the fabrication of other small sized electrical instrumentalities incorporating a plurality of extending terminal wires.

By way of general introduction, FIGURE 1 is intended to be schematically illustrative of a practicable sequence of operations includable in the continuous assembly production line method employing a dispensable conveyor strip in the manufacture of ceramic disc type capacitors. As shown in FIG. 1, the conveyor material is drawn in strip or web form from a supply reel 120 by a pair of pressure rollers 121 and is drawn successively through a series of operating stations such as a pilot hole perforating station A wherein a series of indexing pilot holes are punched in the web, a web slitting station B wherein spaced longitudinal slits are made in the web intermediate the pilot hole perforation therein, a terminal wire subassembly forming an insertion station C wherein a length of terminal wire is formed and inserted into the terminal wire subassembly mounting slits in the web, a terminal wire end-forming station D wherein the ends of the inserted terminal wire subassembly are deformed to receive a ceramic capacitor disc, and a ceramic disc insertion station E wherein ceramic capacitor discs are inserted into the deformed ends of the terminal wire subassemblies, and a web drive indexing unit F, adapted to intermittently advance the web a predetermined distance during each cycle of operation with intermediate dwell periods during which time the other operating components are actauted to perform their respective operative functions. Subsequent to the passage of the web through the web drive unit F, the web and the capacitor subassemblies mounted thereon are drawn through a flux dipping station G wherein the web mounted ceramic capacitor disc subassemblies are treated with a flux and a solder dipping station H wherein the flux treated units are soldered prior to a winding of the strip on a winding reel 122. Cooperatively associated with the above identified operating units is a terminal wire supply reel 124, a wire straightening station I, a terminal wire drive station J, and a terminal wire cutting station K all arranged to present a predetermined cut length of straightened terminal wire 123 to the terminal wire insertion station C for the formation of the terminal wire subassembly and insertion of the same into the previously prepared web of dispensable conveyor material.

The sequence of operation schematically set forth in FIGURE 1 is not intended to represent the entire sequence of operations necessary to effect the production of finished capacitors but rather shows only a sufficient portion thereof to enable those skilled in the art to understand the nature and advantages of the hereinafter described and claimed invention.

FIGURE 2a illustrates a small segment of the elongate strip of web of conveying medium 125 as removed from the supply roll 120. The strip 125 is preferably formed of a relatively thin dispensable or expendable flexible material of a paperlike character, such as the relatively thick paper generally used in file folders or tabulating cards or the like and is of a width sufficient to accommodate the size of finished capacitors or other electrical instrumentalities being fabricated. In order to be advantageously utilized as a conveying medium during the manufacturing operations and as a packaging mount for the finished articles that may be utilized in automatic assembly machinery, the strip material should have the properties of flexibility, internal resilience or elastic resistance to deformation and condition impervious mechanical strength. More specifically the web material should be of sufficient flexibility to permit it to follow a predetermined path with possible relatively rapid changes of directional position through the sequentially arranged operating stations and to permit it to be convolutely wound in roll form either during or at the end of the fabrication operations. The strip material should also have sufficient mechanical strength to permit utilization of a pin engaging type tension drive to advance the same without deformation of pin engaged portions thereof and with minimal amounts of elongate stretching or yielding under the widely varying conditions of temperature, humidity and solvent concentration that are usually encountered in the fabrication of capacitors and other similar electrical instrumentalities and in the automatic assembly machines that may utilize the resultant product. Additionally the strip material should have sufficient integral internal resilience or elastic resistance to deformation so as to permit portions thereof deformed and displaced and of the plane of the remainder to compressively engage and retain article subassemblies disposed in abutting relation therewith independent of strip or web displacement. If the conveying medium is going to be employed in an automatic test apparatus arranged to test the web mounted articles it is also necessary that the media have insulating properties.

A material having the desired properties of flexibility, integral internal resilience and condition impervious mechanical strength is C-3 Kraft Insulation Sheet as manufactured by the Stevens Paper Mills, Inc. of Windsor, Connecticut in a thickness of .010 inch. The chemical properties of this medium are as follows:

Fibre content _____ 100% kraft wood pulp.
Percent ash (max.) _____ .6%.
pH Water extract _____ 6.8–7.8.
Percent moisture _____ 6.5–8.0%.
Chlorides, sulphates _____ 4 to 8 p.p.m.

The apparent density of this media is about 1.0 gram per cubic centimeter and its dielectric strength (as per Test Method ASTM–D149–47T Method A) is about 275 volts/mil. The weight of this material is about 55 pounds per 1000 sq. feet.

Figure 2B:
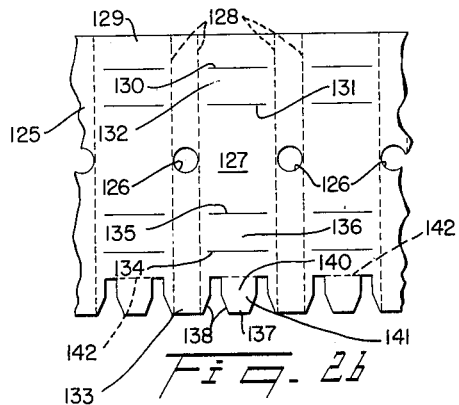

FIGURE 2b illustrates the deformed configuration of a portion of the conveyor medium 125 as it exits from the operating station structure hereinafter described and forming a portion of the subject matter of this invention. As there illustrated the strip or web 125 is provided with a plurality of successive pilot hole perforations 126 uniformly spaced equal distances apart and preferably disposed substantially equidistant from the edges of web. Successive perforations 126 serve to define an article subassembly receiving area or channel 127 disposed therebetween as generally indicated by the area disposed intermediate the dotted lines 128. Disposed within each area 127 and positioned intermediate successive pilot hole perforations 126 and the edge 129 are a pair of longitudinally disposed spaced apart slits 130, 131 defining a first web integral retaining strap 132 disposed therebetween. Similarly and positioned intermediate the successive pilot hole perforations and the edge 133 are a second pair of longitudinally disposed slits 134, 135 disposed in transverse alignment with the slits 130, 131 and defining a second web integral retaining strap 136 disposed therebetween.

The edge 133 is preferably deformed to provide a bendable tapered tongue portion 137 symmetrically disposed relative to the transverse center line of each of the areas 127. Specifically, the edge portion is suitably cut or punched as to provide an edge abutting inwardly tapered portion 138 and an inwardly disposed rectangular portion 139. Such configuration provides the tongue 137 with a base portion 140 disposed transverse to the longitudinal center line of the strip 125 and a tapering outer portion 141, both bendable as a unit out of the plane of the remainder of the strip along the dotted line 142.

Figure 2C:
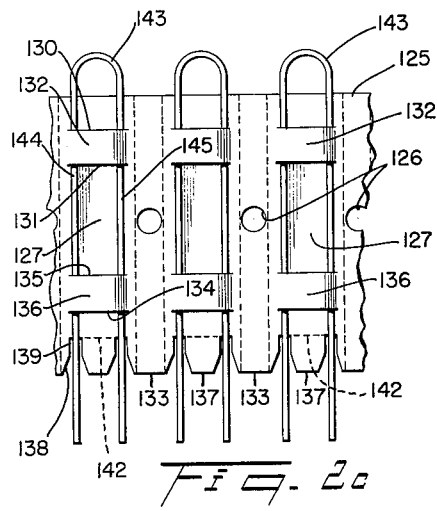
Figure 2D:
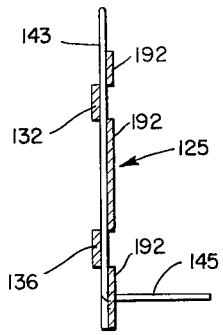
FIGURE 2d is a sectional view of a modified and permitted positioning arrangement.
Figure 3:
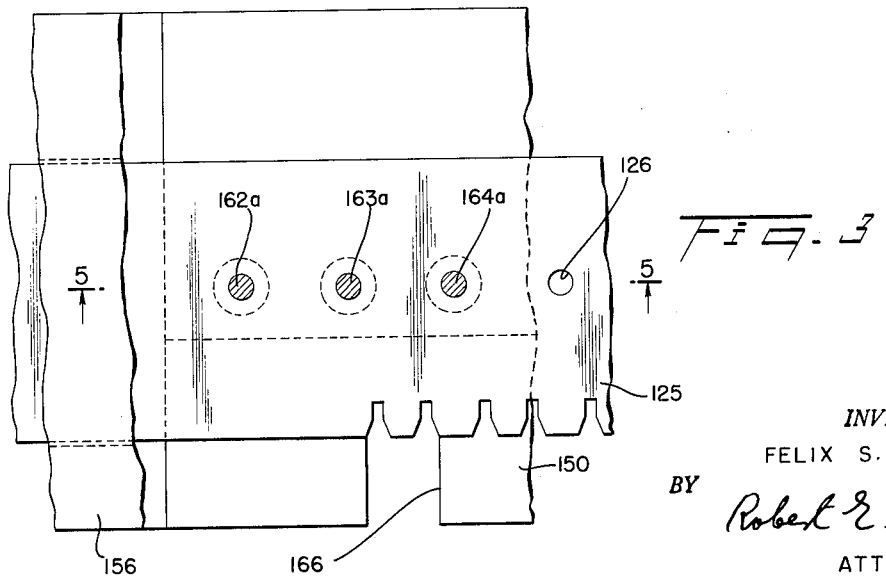

FIGURE 2c illustrates the utilization of the strip of FIGURE 2 as a conveying medium in the continuous assembly production line methods herein of particular interest. As there set forth, the retaining straps 132 and 136 are displaced out of the plane of the remainder of the strip and form, in cooperative relation with the reversely displaced adjacent portions 192 thereof (compare FIGS. 9 and 10), the transversely disposed article receiving channel 127 adapted to contain a multiwire terminal subassembly such as the illustrated U-shaped "hairpin" type terminal lead assembly 143. The arms 144 and 145 of the hairpin terminal lead assembly are disposed beneath the straps 132 and 136 and above the remainder of the strip surface defining the channel 127 in transverse alignment therewith and with the dependent ends thereof in overlying aligned relationship with the cutout portions 138 and 139 defining the tongue 137 on the edge 133 of the strip. The disposition of the arms 144 and 145 in the crotches formed at the end of the slits 130, 131, and 134, 135 prevents any displacement of the hairpin assembly 143 in the direction of strip length and deformation of the hairpin assembly 143 within the channel is minimized if not actually prevented by bending the tongue 137 upwardly along the foldline 142 intermediate the extending end portions of the arms 144, 145 at a location disposed inwardly of the strip edge 133. Alternatively the tongue portion 137 may be left unbent and the extending arm portions 144 and 145 disposed in overlying relation with the cutout portions may be bent at substantially right angles to the plane of the strip, as illustrated in FIGURE 2d, for anti-deformation purposes. The internal resilience of the strip material coupled with the above described engagement of the hairpin lead assembly 143 by the straps 132 and 136 prevents displacement of the lead assembly 143 in a direction perpendicular to the strip surface and additionally minimizing, if not actually prevents any undesired twisting or turning of the wires. Moreover, the internal resilience of the strip material coupled with the relatively large area of contact between the hairpin lead assembly 143 and the strip surface is sufficient to prevent undesired displacement of the lead assembly 143 within the channel 127 and transversely to the strip as would be occasioned by strip flexing and bending encountered during its advance and yet to permit such displacements when desired to be effected by engagement of the hairpin lead assembly 143 by an operating element. Reference is made to U.S. Patent No. 3,079,957 entitled Terminal Wire Forming and Assembly Apparatus for Electrical Components, also a division of Ser. No. 579,679 filed April 20, 1956, which is assigned to the assignee hereof, for details of the hairpin lead wire insertion into the conveying medium herein described.

As the above description shows, the illustrated and described construction for the conveying medium assures a positive releasably secured positioning of the article subassemblies mounted thereon without resort to any extrinsic fastening means and, due to the positive uniform relationship between the pilot hole perforation 126 and the retaining straps 132, 134, assures proper indexing and positioning of the strip mounted subassemblies with the operating elements of either the subsequent operating stations or in the automatic assembly machinery of the type mentioned earlier in this specification.

FIGURES 3 to 6 illustrate the essential mechanical components of a presently preferred construction for the pilot hole perforating station A of FIGURE 1, wherein the indexing pilot holes 126 are successively punched at predetermined and carefully spaced intervals in the advancing web of conveyor material. It should be noted that the following description omits, in the interest of brevity, the details of the drive mechanisms necessary to effect the indicated modes of operation, as such are matters of particular machine design and are well within the skill of the art.

Referring to the drawings, there is provided a stationary die plate 150 having a plurality of vertically disposed spaced bores 151, 152 and 153 therein. Each of said bores contains a hardened die sleeve 154 with the upper ends thereof being disposed coplanar with the upper surface of said die plate 150 which in turn is disposed coplanar with the upper surface of an adjacent stationary web supporting shelf member 155. The shelf member 155 is positioned beneath a stationary channeled web guide member 156 and cooperates therewith to define an enclosed web guiding channel 157 sized to contain the advancing web of conveyor material 125 and to accurately position the same transversely to the direction of web advance. The channeled web guide member 156 is provided with suitable apertures 158, 159, 160 disposed in vertical alignment with the bores 151, 152 and 153, respectively, in the die plate 150 positioned therebeneath. Disposed above the die plate 150 and the channeled guide member 156 is a vertically reciprocable punch pad 161 having a punch member 162 and a pair of rounded end pilot pins 163 and 164 mounted therein so as to have the extending ends thereof 162a, 163a and 164a in alignment with the bores 151, 152 and 153.

As best shown in FIG. 5, the extending ends of the pilot pins 163 and 164 are of greater length than the extending end of the punch member 162. This length relationship permits the pilot pins, on the downward displacement of the vertically reciprocable punch pad 161, to pass through the previously punched pilot hole perforations in the web material 125 prior to engagement of said web material by the punch member 162, thereby assuring uniformity of spacing of said pilot hole perforations for indexing purposes in both this and subsequent operating stations.

The vertically reciprocable punch pad 161 also contains an auxiliary side punch 165 positioned to reciprocate through a suitably shaped aperture 166 in the edge portion of the channeled web guide member 156 and into operative cutting engagement with a complementally shaped die section 167 forming part of the stationary die plate 150. The side punch 165 is shaped to cut the edge portion of the web 125 so as to form the tongue 137 on the edge 133 as shown in FIGURE 2b.

In operation of the above described unit, the untreated web 125 of conveyor material as shown in FIGURE 2a is advanced within the web guiding channel 157 by action of a cyclically operable web drive mechanism as schematically illustrated at F in FIGURE 1. During each cycle of operation the web 125 is advanced an amount substantially equal to the spacing between successive pilot hole perforations 126 therein and is then halted during a predetermined dwell period to permit the necessary operations to be performed with respect thereto. During the period of web advance, the vertically reciprocable punch pad 161 is positioned at or near its upward limit of displacement with the extending ends 163a and 164a of the pilot pins being maintained clear of the path of travel of the advancing web 125 within the web guiding channel 157. Upon cessation of web advance the punch pad 161 is downwardly displaced and the initial engagement of the descending rounded end pilot pins 163 and 164 with the previously punched pilot hole perforations 126 in the web 125 will effect any needed minor correction of web position and thereby insures an accurate prepositioning of the web material relative to the descending pilot hole punch 162 to the end of providing a high degree of uniformity of spacing between the pilot hole perforations 126 therein.

Continuing downward displacement of the punch pad 161 results in pilot hole perforation of the web 125 by the descending punch 162 and in the formation of the tongue 137 (see FIG. 2b) by the descending side punch 165. After completion of the above operations effected during the downward displacement of the punch pad 161, the pad 161 is upwardly displaced to disengage the dependent elements from the web 125 and thereby clear the web guiding channel 157 for further web advance during the next machine cycle.

FIGURES 7 to 11 illustrate the mechanical essentials of a presently perferred apparatus includable in the web slitting station B to provide the spaced pairs of longitudinal slits 130, 131 and 134, 135 in the web material 125 intermediate successive pilot hole perforations 126 therein as illustrated in FIGURE 2b.

Referring to the pertinent drawings, there is provided a stationary die pad 180 having a spaced pair of upwardly protruding bossed die inserts 182 mounted therein intermediate a plurality of recessed die inserts 183. Positioned above the stationary die pad 180 is a portion of the channeled web guide member 156 so arranged as to assure maintenance of the web material 125 closely adjacent the surface of the die pad 180. The portion of the channeled web guide member 156 disposed above the operating surface of the die inserts 182, 183 is provided with a suitable punch passing aperture as at 190. Cooperatively associated with the die inserts 182, 183 mounted in the stationary die pad 180 is a vertically reciprocable punch pad 184 having a pair of recessed punch inserts 186 mounted therein intermediate a plurality of bossed punch inserts 188. Each strap 132, 136 as formed (only strap 136 is shown in FIG. 10) has protruding portions 136a at the extremities of the strap, interconnected by a flat portion 136b. The reversely displaced areas 192 (FIG. 9) have reversely protruding marginal portions 192a interconnected by a flat portion 192b. The punch inserts 186, 188 are arranged, as illustrated in the drawings, to cooperate with the die inserts 182 and 183 to produce two pairs of longitudinally disposed slits 130, 131 and 134, 135 and to form the raised straps 132, 136 and the adjoining reversely displaced areas 192 in the web material 125 to provide channel 127 intermediate each pair of pilot hole perforations 126 therein.

In order to assure proper longitudinal disposition of the pairs of slits 130, 131 and 134, 135 intermediate the immediately adjacent pilot hole perforations 126 in the web, the above described web slitting structure is preferably disposed immediately adjacent to the previously described pilot hole perforation station A so that the pilot pins 163 and 164 therein can also function to insure proper web positioning in the web slitting station B. Alternatively, if said assembly is spaced any appreciable distance from the previously described pilot pins 163 and 164, it is desirable that the mechanical components associated with the web slitting station B include indexing means such as a pilot pin receiving base 192 and a pilot pin 194 as indicated by the dotted lines in the stationary die pad 180 and vertically reciprocable punch pad 184, respectively in FIG. 9.

In operation of the above described presently preferred mechanical elements includable in the web slitting station, the vertically reciprocable punch pad 184 is positioned at or near its upward limit of displacement during that portion of operating cycle in which the web material 125 is being advanced intermediate the channeled web guide member 156 and the upper surface of the stationary die plate 180. Upon cessation of web advance, the punch pad 184 is downwardly displaced into operative engagement with that portion of the web material positioned above the die inserts 182, 183. The compressive engagement of the web intermediate the complementary operating surface of the punch inserts 186, 188 and the die inserts 182, 183 results in production of the desired two pairs of raised straps 132, 136 and adjoining reversely displaced portions 192 properly positioned relative to the adjacent pilot pin perforations 126. Following the slitting of the web material 125 effected at or near the limit of downward disaplacement of the punch pad 184, said punch pad is upwardly displaced to clear the web guiding channel 157 for permitted advance of the web material 125 during the next cycle of machine operation.

Having thus described my invention, I claim:

1. A dispensable conveying medium for continuous assembly production line methods of manufacture of capacitors and similar electrical instrumentalities, comprising an elongate strip of paper-like material having means defining a plurality of longitudinally distributed areas for containing such articles, said means of each area comprising at least one longitudinally disposed retaining strap integral with said strip, said strap and the portions of the strip transversely adjacent to said strap being reversely displaced from said strip defining a transversely disposed channel adapted to releasably contain and position a transversely extending subassembly therein, and a longitudinally distributed series of pilot hole perforations in said strip.

2. The conveying medium as set forth in claim 1 wherein an edge portion of said strip has transverse notches aligned with the lateral extremities of said channel to provide a tongue in alignment with each said article reciving area proportioned to be interposed between laterally spaced legs of an inserted article.

3. A conveying medium in accordance with claim 1 wherein said strip includes areas interposed between said channels and wherein said pilot hole perforations are disposed in said interposed areas.

4. A dispensable conveying medium for continuous assembly production line methods of manufacture of capacitors and similar electrical instrumentalities, comprising an elongate strip of paper-like material having means defining a plurality of longitudinally distributed areas for containing such articles, said means of each area comprising a pair of retaining straps integral with said strip, each of said straps extending lengthwise of said strip and said pair of straps being transversely aligned and spaced from each other and from the edges of the strip, said straps and the portions of the strip transversely adjacent to said straps each being displaced from said strip and the displacement of said straps being the reverse of said adjacent portions of the strip defining a transversely disposed channel adapted to relasably contain and position a transversely extending subassembly therein, one margin of said strip having notches therein transversely aligned with the sides of the channel so as to define a tongue receivable between wires of the subassembly at the sides of the channel.

5. A conveying medium in accordance with claim 4 wherein said medium includes interposed areas between the successive channels, said interposed areas having a longitudinally distributed series of pilot hole perforations therein.

6. A dispensable flexible conveying medium for articles having a pair of spaced parallel extending legs, comprising an elongate strip of paper-like material having means defining successive transverse areas for containing such articles, said means in each area including at least one retaining strap extending along the strip and trasverse to said article containing area, each said strap being defined by portions at the longitudinal extremities thereof protruding integrally from said strip and interconnected by an integral relatively flat portion, the portions of the strip in each article containing area adjoining said strap having marginal protruding portions in transverse alignment with said protruding portions of the strap, the protruding portions of the strap and the protruding portions of said strip aligned therewith protruding from the strip in opposite directions, the transversely aligned projecting portions of the strap and of the strip defining a pair of oppositely disposed article-leg receiving crotches, and a plurality of longitudinally distributed pilot hole perforations in said strip.

References Cited by the Examiner
UNITED STATES PATENTS

| | | | |
|---|---|---|---|
| 1,175,957 | 3/1916 | Josephson | 206—79 |
| 1,208,701 | 12/1916 | Trenner. | |
| 1,245,805 | 11/1917 | Schneider | 206—80 |
| 1,378,262 | 5/1921 | Meyer | 206—79 |
| 1,445,795 | 2/1923 | Parker. | |
| 2,214,230 | 9/1940 | Freeburg | 206—65 |
| 2,767,532 | 10/1956 | Bossi | 206—65 |
| 2,794,549 | 6/1957 | Feibusch | 206—82 |
| 2,868,371 | 1/1959 | Thorpe | 206—79 |
| 2,929,130 | 3/1960 | Packman | 206—65 |

THERON E. CONDON, *Primary Examiner.*